United States Patent [19]

Koppelman et al.

[11] 4,106,999
[45] Aug. 15, 1978

[54] CONTINUOUS THERMAL REACTOR

[75] Inventors: Edward Koppelman, 4424 Bergamo Dr., Encino, Calif. 91316; Robert G. Murray, Palo Alto, Calif.

[73] Assignee: Edward Koppelman, Encino, Calif.

[21] Appl. No.: 849,176

[22] Filed: Nov. 7, 1977

Related U.S. Application Data

[63] Continuation-in-part of Ser. No. 682,600, May 3, 1976, Pat. No. 4,069,107.

[51] Int. Cl.² ............................................. C10B 49/18
[52] U.S. Cl. ........................................ 202/118; 48/63; 48/206; 201/12; 201/34; 201/36; 202/120; 202/121
[58] Field of Search ...................... 201/12, 28, 34, 36, 201/38; 202/117, 118, 120, 121; 432/13, 14, 215; 23/284; 34/168, 174; 48/63, 64, 206; 208/8, 11 R

[56] References Cited

U.S. PATENT DOCUMENTS

| | | | |
|---|---|---|---|
| 1,698,345 | 1/1929 | Puening | 201/12 |
| 2,735,805 | 2/1956 | Mora | 201/34 |
| 2,835,051 | 5/1958 | Rydin | 34/174 |
| 3,117,064 | 1/1964 | Friedrich | 201/12 X |
| 3,499,834 | 3/1970 | Goins | 208/11 R |
| 3,855,071 | 12/1974 | Koppelman | 201/34 X |

Primary Examiner—Morris O. Wolk
Assistant Examiner—Arnold Turk
Attorney, Agent, or Firm—Harness, Dickey & Pierce

[57] ABSTRACT

Apparatus for continuously pyrolyzing, vaporizing or gasifying a particulated carbonaceous feed material in which preheated heat-containing bodies or pebbles are admixed with the feed material in a stratified manner to form a downwardly moving columnar reaction mass, with a remaining portion of the pebbles substantially devoid of any feed material disposed in a surrounding layer relative to the reaction mass. Gas is continuously passed transversely through the reaction mass and surrounding layer in a manner to sweep the gaseous pyrolysis reaction products out of the reaction chamber and wherein the layers of pebbles surrounding the reaction mass serve to effect a deposition of carbonaceous residue preventing encrustation and fouling of the reactor. The pebbles are separated from the pyrolyzed residue comprising an activated char, a residual ash or stripped residue and are recirculated internally of the reactor during which they are reheated in a manner to remove any residual carbonaceous deposits therefrom and thereafter are reintroduced into the reaction chamber.

17 Claims, 5 Drawing Figures

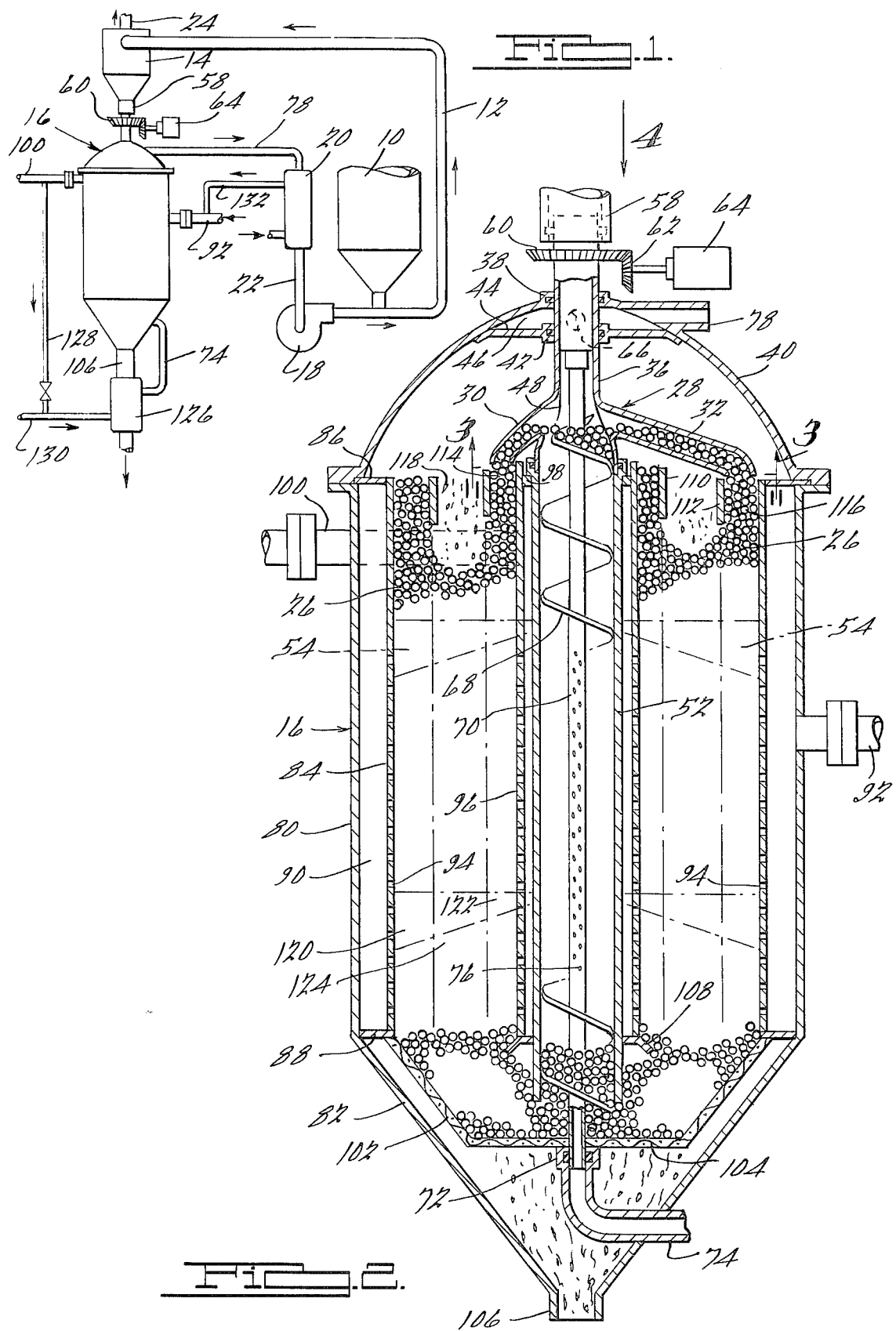

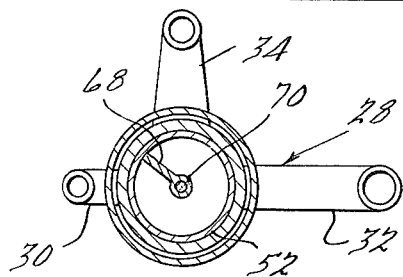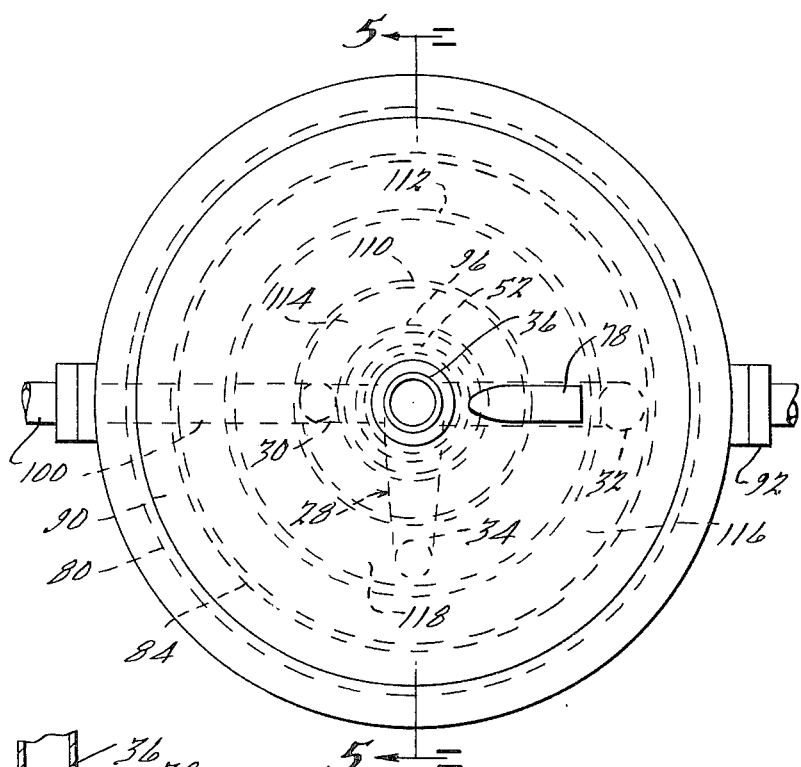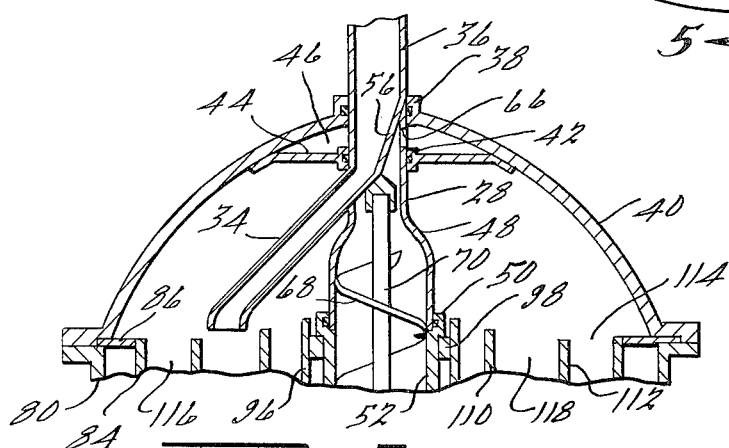

CONTINUOUS THERMAL REACTOR

REFERENCE TO RELATED APPLICATIONS

This application comprises a continuation-in-part of prior copending applications Ser. No. 682,600 filed May 3, 1976 for "Continuous Thermal Reactor System and Method"; now, U.S. Pat. No. 4,069,107.

BACKGROUND OF THE INVENTION

A variety of apparatuses and processes have heretofore been used or proposed for use in the thermal pyrolysis and/or gasification of carbonaceous materials for producing gaseous fuels, activated chars, extraction of valuable hydrocarbon constituents and the like. Conventionally, the carbonaceous material in a particulated form is introduced into a retort or reaction chamber in which it is heated to an elevated temperature while in a controlled atmosphere for a period of time sufficient to effect a thermal degradation or pyrolysis of the feed material accompanied by a liberation of volatile gaseous constituents and gaseous pyrolysis by-products. The carbonaceous feed material can comprise materials of vegetable origin including, for example, tree bark, wood chips, sawdust, rice hulls, nutsheels, corn husks, as well as vegetable derivatives, such as peat, lignite, coal, and materials containing such carbonaceous substances, such as oil shale and tar sands.

A continuing problem associated with processes of the foregoing type has been the tendency of the gaseous pyrolysis products produced to deposit on the surfaces of the carbonized product produced, as well as on the surfaces of the equipment, reducing the efficiency of the pyrolysis reaction and also necessitating frequent shutdowns to remove the carbonaceous deposit from the walls of the retort and associated gas passages. In the manufacture of activated char or carbon employing thermal pyrolysis reactors of the foregoing type, the redeposition of the carbonaceous residues on the surfaces of the char produced substantially reduces the activity of the activated carbon product normally necessitating supplemental activation treatments. The deposition of carbonaceous residues on the equipment surfaces in the form of tars and coke obstructs the uniform flow of the feed material and an efficient removal of the gaseous by-products frequently causing localized hot spots, causing an overcracking or excessive thermal degradation of the gaseous by-products, which still further aggravates the formation and deposition of carbonaceous residues.

In the prior copending application, a process and apparatus is disclosed which overcomes many of the problems associated with prior art apparatuses and techniques by providing a pyrolysis reactor system in which improved control of the uniformity of heating of the carbonaceous feed material is achieved and wherein the deposition of carbonaceous residue on equipment surfaces and on the carbonized product itself is substantially reduced. In the adaptation of the apparatus and process for making activated carbon, a continuous production of activated carbon having high adsorptive capacity is provided without requiring further activation treatments as is required in accordance with prior art techniques. The apparatus of the present invention provides similar benefits as are achieved in accordance with the prior invention and further provide for an improved reactor apparatus which is more compact, more efficient and of increased versatility.

SUMMARY OF THE INVENTION

The benefits and advantages of the present invention are achieved by a reaction apparatus comprising a reactor vessel of a generally upright configuration having a reaction chamber into which a carbonaceous feed material is introduced through a feed inlet connected at the upper portion thereof. Preheated solid heat transfer media or pebbles are introduced into the upper portion of the reaction chamber through a rotary distribution system in which a portion of the pebbles are substantially uniformly mixed with the feed material forming a downwardly moving columnar reaction mass and the balance of the pebbles are distributed in the form of layers surrounding the inner and outer surfaces of the reaction mass and which layers are substantially devoid of any of the feed material. The reaction chamber is provided with a gas inlet and a gas outlet for introducing a gas, such as steam, carbon dioxide and/or air, into the reaction chamber in a manner to pass substantially transversely through the pebble layers and reaction mass to effect a sweeping of the gaseous pyrolysis decomposition products and volatile constituents formed which are withdrawn through a gas outlet disposed in transverse spaced relationship from the gas inlet. The upstream layer of pebbles disposed adjacent to the gas inlet effects a preheating of the introduced gas or a superheating of the steam introduced, as the case may be to a desired temperature level, while the downstream layer of pebbles disposed adjacent to the gas outlet serves to further thermally decompose and gasify the volatilized gaseous constituents and serves as a depository for the carbonaceous substances produced effecting an extraction thereof from the gaseous effluent before coming in contact with the structure and associated conduits defining the gas outlet.

The lower portion of the reaction chamber is provided with a separator for separating the pebbles and the carbonaceous char product or solid ash residue which, after further cooling, is discharged from the reactor. The separated pebbles are recirculated through a centrally extending conduit extending upwardly through the reaction chamber by means of a suitable conveying device such as a screw type conveyor and during the upward movement of the pebbles, air or other combustive gases are introduced so as to effect a combustion and removal of the carbonaceous deposits thereon and a reheating of the pebbles to a desired temperature. Upon attaining the upper outlet end of the recirculation conduit, the pebbles reenter the rotary distributor device and are reintroduced into the upper end of the reaction chamber. In the operation of the reactor to produce an activated char, the immediate removal of the gaseous pyrolysis products formed prevents a redeposition thereof on the active sites of the carbonized product produced such that the carbonized product is characterized as being possessed of high adsorptive capacity necessitating no further activation treatment.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a schematic layout of a continuous reactor apparatus arranged in accordance with a preferred embodiment of the present invention;

FIG. 2 is a magnified vertical longitudinal sectional view of the reactor apparatus section of the arrangement shown in FIG. 1;

FIG. 3 is a fragmentary transverse sectional view of the rotary distributor of the reactor shown in FIG. 2 as viewed substantially along the line 3—3 thereof;

FIG. 4 is a horizontal plan view looking downwardly of the reactor shown in FIG. 2 substantially along the line 4—4 thereof and;

FIG. 5 is a fragmentary longitudinal sectional view of the upper portion of the reactor as shown in FIG. 4 and as taken substantially along the line 5—5 thereof.

DESCRIPTION OF THE PREFERRED EMBODIMENTS

The schematic arrangement of the apparatus as shown in FIG. 1 is particularly adapted but not necessarily limited to the continuous pyrolysis of vegetable matter, such as tree bark, wood chips, sawdust, rice hulls, nutshells, corn husks, as well as vegetable derivatives, such as peat, lignite, coal, and materials containing such carbonaceous substances, such as pulverized oil shale and tar sands, for example. When the feed material comprises a particulated vegetable origin substance, such as wood chips, for example, an activated carbon or char product is produced of a type suitable for use as an adsorbent and upon further communition as a filler in a variety of elastomeric and resinous compositions.

As shown in FIG. 1 a particulated carbonaceous feed material of any of the types as hereinabove set forth is loaded into a hopper 10 and transferred through an air lift conduit 12 to a storage hopper 14 disposed at an elevated position above the upper end of a reaction vessel 16. A high capacity blower 18 is connected to the inlet of the airlift conduit for effecting an entrainment and lifting of the particulated feed material through the air lift conduit, which in accordance with the specific arrangement illustrated can also effect a partial drying and/or preheating of the feed material during the course of its conveyance and storage. The inlet of the blower 18 is connected to the outlet of a waste heat steam generator 20 by means of a conduit 22 wherein the sensible heat remaining in the hot effluent gases of the reactor are utilized to effect a partial drying and/or preheating of the feed material. The storage hopper 14 is constructed in the form of a cyclone-type separator, whereby the particulate matter is retained and the conveying gas is harmlessly discharged to the atmosphere through a stack 24.

Referring now to FIG. 2 of the drawings, the interior of the reaction vessel or reactor 16 is substantially completely filled with a solid heat transfer media or pebbles indicated generally at 26 which during the operation of the apparatus are preheated to an elevated temperature and are simultaneously cleansed of any carbonaceous residues or coke deposits thereon prior to being admixed with the feed material in the upper end of the reactor vessel. The heat transfer media or pebbles may comprise any substance which is possessed of a high heat capacity, which is resistant to attrition, which is capable of withstanding the elevated temperatures to which they are subjected and which are of relatively low cost, While various temperature-resistant metals and metal alloys, including cast iron, can be employed for this purpose, refractory ceramic compositions are usually preferred and of which alumina constitutes a particularly satisfactory substance. The configuration of the heat transfer bodies or pebbles preferably is of a generally spheroidal shape and of substantially uniform size in order to provide a reaction mass of substantially uniform porosity and which will move downwardly through the reaction zone of the reactor under the influence of gravity. The size of the pebbles may range from a diameter of about $\frac{1}{4}$ inch up to about $\frac{3}{4}$ inch, while sizes of from about $\frac{3}{8}$ inch to about $\frac{1}{2}$ inch diameter are usually preferred. The particular size of the pebbles employed is selected in consideration of the type and particle size of the carbonaceous containing feed material processed and wherein the pebbles are of a size generally greater than the feed material particle size.

The upper end portion of the reactor 16 as best seen in FIGS. 2-5 is provided with a rotary distributor assembly 28 which is adapted to rotate about a vertical axis extending centrally through the reactor. The rotary distributor comprises an inner pebble distributor nozzle 30, an outer pebble distributor nozzle 32 and a feed distributor nozzle 34 affixed at their inner ends and projecting substantially radially of a tubular shaft 36. The tubular shaft 36 is rotatably supported by an upper bearing 38 mounted in the center of the dome shaped top wall 40 of the reactor and a lower bearing assembly 42 mounted in a transversely extending wall 44 positioned in spaced relationship below the domed top wall and joined around its periphery to form a gas tight seal. Both the upper and the lower bearings 38, 42 incorporate suitable gas tight seals which in combination with a portion of the top wall 40 and transverse wall 44 define a gas tight chamber 46. The lower portion of the tubular shaft 36 as best seen in FIG. 5 is formed with an enlarged bell shaped section 48 having the lower end thereof disposed in a gas tight slip fit bearing 50 mounted on the upper end of a stationary pebble lift tube 52 extending centrally of the reactor and terminating at a point spaced from the lower portion thereof. The pebble lift tube 52 is supported by triangular brackets 54 as indicated in phantom in FIG. 2.

The tubular shaft 36 is closed at a point above the bell shaped section 48 by an angularly extending wall or partition 56 defining a portion of the feed material distributor nozzle 34 whereby feed material from the hopper 14 (FIG. 1) passes downwardly by gravity through a feed conduit 58 which is connected through a suitable slip joint connection as shown in FIG. 2 to the upper open end of the tubular shaft 36. Accordingly feed material is continuously discharged downwardly from the hopper 14 through the feed conduit and tubular shaft through the feed material distributor nozzle 34 into the interior of the reactor chamber in response to the rotation of the rotary distributor.

Rotation of the rotary distributor is effected by means of a bevel gear 60 affixed to the upper end of the tubular shaft 36 which is disposed in constant meshing relationship with a drive bevel gear 62 affixed to the output shaft of a variable speed electric motor 64 as best seen in FIGS. 1 and 2.

The tubular shaft 36 is formed with an aperture or port 66 as best seen in FIGS. 2 and 5 located at a position below the angular partition 56 and in communication with the upper chamber 46 through which flue gases are discharged from the pebble lift tube 52 and bell shaped section 48 in a manner and for the purposes subsequently to be described. A screw type conveyor or auger 68 including a tubular shaft 70 is connected to the center of the angular partition 56 and is drivingly connected to the rotary distributor 28. The lower portion of the tubular shaft 70 is rotatingly supported in a rotating gas seal assembly 72 of an inlet conduit 74 through which air or a combustible air fuel mixture is adapted to be introduced into the interior of the tubular shaft. The lower portion of the tubular shaft 70 is imperforate to prevent escape of the air or fuel air mixture into the reaction zone of the reactor. The tubular shaft 70 is provided with a plurality of perforations at a point indicated at 76 spaced from the bottom thereof or lower end thereof for permitting the air or fuel air mixture to escape and come in contact with the pebbles being moved upwardly in the pebble lift tube 52 to effect a combustion of the carbonaceous residue thereon effecting a simultaneous cleansing of the pebbles as well as a preheating thereof in response to the rotation of the screw conveyor. The gaseous combustion products or flue gas pass upwardly through the pebble lift tube 52 and through the bell shaped section 48 of the rotor assembly whereafter they pass through the port 66 into the chamber 46 at the upper end of the reactor and are removed through a flue gas outlet conduit 78 as shown in FIGS. 2 and 4 through which they are passed through the waste heat steam generator 20 as shown in FIG. 1. As shown in FIGS. 2, 3, and 4, the inlet ends of the inner and outer pebble distributor nozzles 30, 32 are disposed in communication with the bell shaped section 48 of the rotor assembly by means of appropriately sized ports through which the cleansed and the preheated pebbles are transferred by gravity as they attain the elevated position in the pebble lift tube in response to rotation of the screw conveyor.

In the specific embodiment illustrated in FIG. 2, the interior of the reactor 16 is defined by the dome shaped top wall 40 connected by suitable flanges to a generally circular cylindrical side wall 80 which in turn is connected at its lower end to a generally conical shaped bottom wall 82. An inner annular wall 84 is mounted within the reaction chamber in substantially spaced concentric relationship with respect to the inner surface of the side wall 80 and is closed at its upper end by an annular wall 86 and at its lower end by an annular wall 88. The annular walls 86, 88 are imperforate while the inner annular wall 84 is perforate such as by incorporating a plurality of perforations therethrough along the lower portion thereof. The inner annular wall in combination with the upper and lower annular walls 86, 88 define in combination an annular gas chamber or chest 90 which is disposed in communication with a gas inlet conduit 92 by which a gas, such as steam, carbon dioxide, air, oxygen as well as mixtures thereof can be introduced into the interior reaction chamber through the perforated wall section 94 of the inner annular wall 84.

A gas outlet conduit 96 extends downwardly in spaced substantially concentric relationship around the pebble lift tube 52 as best seen in FIG. 2 and is of a porous or perforate structure along the lower portion thereof along a region corresponding substantially to the perforated section 94 of the inner annular wall 84. The upper end of the gas outlet conduit 96 is imperforate and is sealed by means of a sealing ring 98 forming an annular chamber to which a product gas outlet conduit 100 is connected as best seen in FIG. 4 and extends radially out through the side wall of the reactor.

In the specific arrangement as illustrated in FIG. 2, the foraminous or perforated section 94 of the inner annular wall and of the gas outlet conduit 96 extends vertically along a region of the reaction chamber in which the pyrolysis or gasification reaction of the feed material occurs. Accordingly, the transverse passage of gas continuously or on an intermittent basis from the gas chamber 90 through the reaction bed into and through the foraminous portion or perforated section of the gas outlet conduit 96 effects a continuous sweeping or purging of the volatile constituents and pyrolysis products formed from the reaction bed. It is also contemplated in accordance with an alternative embodiment of the present invention, that only the lower portion of the inner annular wall 84 and gas outlet conduit 96 is formed with a foraminous or perforated structure at a position below the normal pyrolysis zone, such that in the case of the operation of the reactor for producing an activated char product, the carbonaceous char produced is contacted at substantially the conclusion of the pyrolysis reaction with a gas such as steam to effect an activation thereof in the lower region of the reaction zone by removing any deposited constituents from the active sites thereof.

As shown in FIG. 2, the lower portion of the reactor is provided with a generally conically shaped screen 102 formed with a horizontal center section 104 for separating the pebbles from the pyrolyzed carbonaceous product or the residual ash in the case of a gasification operation. Alternatively in the case of finely comminuted oil shale or tar sands, the pebbles are separated from the residual strip sand or shale which passes through the holes in the screen and are discharged from the base of the reactor through an outlet or discharge conduit 106.

The lower inlet end of the pebble lift tube 52 is spaced upwardly of the center section 104 of the screen forming therebetween an annular inlet nozzle for the pebbles. The screw type conveyor extends downwardly to a position adjacent to the upper surface of the screen. Accordingly the pebbles and carbonized feed material or residue move downwardly and radially inwardly along the conical section of the screen and thence substantially horizontally inwardly toward the inlet of the pebble lift tube whereby they are lifted in response to rotation of the screw conveyor upwardly through the lift tube for recycling through the pebble inner and outer discharge nozzles. In this regard, the lower outer portion of the pebble lift tube is formed with a radially downwardly projecting annular flange 108 which serves to support the lower end of the gas outlet conduit 96 and also serves to maintain the integrity of the pebbles surrounding the periphery of the gas outlet conduit by restricting downward movement of the inner portion of the pebbles thereby assuring continuity of the pebble layer over the length of the foraminous section of the gas outlet conduit.

The upper portion of the reaction chamber as best seen in FIGS. 2 and 4 is provided with an inner circular baffle or shroud 110 and an outer circular baffle or shroud 112 which are disposed substantially concentrically to each other and to the inner surface of the inner annular wall 84 and the outer surface of the gas outlet conduit 96. The upper edges of the inner and outer baffles 110, 112 are disposed adjacent to the lower edges of the distributor nozzles of the rotary distributor. The inner baffle 110 in combination with the periphery of the gas outlet conduit 96 define an inner annular distribution chamber 114 while the outer circular baffle 112 in combination with the inner surface of the inner annular wall 84 define an outer annular distribution chamber 116 for feeding the heated pebbles into the upper end of the annular reaction chamber in the form of two concentric annular layers. The lower ends of the inner and outer circular baffles terminate at a point spaced above the foraminous sections of the annular wall 84 and gas outlet conduit 96. As shown in FIGS. 2 and 4, the outlet of the inner pebble distributor nozzle 30 is disposed at a radial distance in alignment with the inner annular distribution chamber 114 while the outlet of the outer pebble distributor nozzle 32 is disposed in vertical alignment above the outer annular distribution chamber 116. On the other hand, the outlet of the feed material distributor nozzle 34 is disposed in vertical alignment above an annular feed distribution chamber 118 as defined by the annular space between the inner and outer circular baffles.

In accordance with the foregoing arrangement, the preheated pebbles are introduced into the upper ends of the inner and outer annular distribution chambers and move downwardly through the action of gravity and thereafter move in a converging fashion upon passing beyond the lower edges of the circular baffles for admixture with the particulated feed material introduced into the annular feed distribution chamber 118. The particulated feed material becomes uniformly admixed with the preheated pebbles as they tumble in converging relationship upon passing beyond the lower edges of the circular baffles.

As will be apparent in accordance with the arrangement illustrated in FIG. 2, the pebble heat transfer media is in the form of stratified layers comprising an outer layer or stratum disposed adjacent to the inner annular wall 84 and an inner layer or stratum disposed around the periphery of the gas outlet conduit 96 indicated at 120 and 122 respectively. The outer stratum 120 and inner stratum or layer 122 are substantially devoid of any carbonaceous feed material. Disposed between the outer and inner layer of pebbles in an annular-shaped reaction mass or stratum indicated at 124 comprising a uniform mixture of the particulated feed material and pebbles which moves downwardly in the form of an annular columnar mass. During the downward movement of the reaction mass, a suitable gas or gaseous mixture is continuously or intermittently introduced into the gas chamber 90 for passage in a substantially transverse and radial inward direction through the outer annular layer, the annular reaction mass and the inner annular layer to effect a sweeping of the volatile constituents and gaseous pyrolysis decomposition products through the porous reaction bed and out through the gas outlet conduit 96. The annular layer of pebbles or upstream layer disposed adjacent to the foraminous section 94 of the inner annular wall serves to heat the entering gas to a temperature approaching that of the reaction mass. When the gas comprises steam, the saturated steam is super heated while any super heated steam employed becomes further super heated upon passage through the outer annular layer of pebbles and in heat transfer relationship therewith. The inner annular layer or downstream layer of pebbles serves as a depository for the tarry carbonaceous reaction products, coke and carbon deposits, preventing any appreciable deposition of such residues on the surfaces of the gas outlet conduit and associated equipment. The inner annular or downstream layer of pebbles also effects a further thermal decomposition and/or cracking of the volatilized constituents during the pyrolysis or gasification process.

It will be understood, that the transverse flow of gas through the reaction mass can be reversed, if desired, whereby gas is introduced into the product gas outlet conduit 100 and passes substantially transversely and radially outwardly through the reaction mass and passes through the foraminous section 94 into the chamber 90 and is withdrawn through the gas inlet conduit 92. In such event, the inner pebble layer 122 becomes the upstream layer while the outer pebble layer 120 becomes the downstream layer. In accordance with the preferred operation of the apparatus, gas flow passes radially inwardly from the chamber 90 through the foraminous section of the gas outlet conduit in a manner as previously described.

In operation, the variable speed drive motor 64 is energized to effect a rotation of the rotor assembly at a controlled speed. Feed material is introduced from the storage hopper 14 through the feed conduit 58 into the upper end of the tubular shaft for discharge in a circular pattern through the feed material distributor nozzle. It will be appreciated that the feed conduit 58 can be provided with a suitable feeder mechanism (not shown) such as a paddle or star type feeder for controlling the rate of feed of material to the reactor. Simultaneously, the preheated and cleansed pebbles passing upwardly beyond the pebble lift tube are discharged into the inner and outer annular distribution chambers by the inner and outer pebble distributor nozzles forming a downwardly moving annular reaction mass comprised of the inner and outer pebble layers devoid of any feed material and an intervening pebble layer incorporating the feed material in admixture therewith. The reaction mass moves downwardly and a suitable gas is transferred from the gas chamber 90 transversely and radially inwardly for sweeping the pyrolysis and reaction products as well as the volatile constituents from the reaction mass which pass through the porous section of the gas outlet conduit 96 and are withdrawn from the reactor through the product gas outlet conduit.

A progressive cooling of the pebbles occurs on moving downwardly through the reaction zone as a result of the loss of heat by direct heat exchange contact with the particulated feed material, the exchange of heat between the pebbles and the gas sweep passing through the reaction mass during the pyrolysis reaction, as well as a result of the heating of the volatilized gaseous pyrolysis products produced in addition to the loss of heat during their separation from the char product or residue in the base of the reactor. The pebbles in the base of the reactor after separation of the product or residue are picked up by the screw conveyor and lifted through the pebble lift tube. The separated pyrolyzed product is withdrawn from the base of the reactor through the discharge conduit 106 which as illustrated in FIG. 1 is provided with a heat exchanger 126 to effect a cooling of the pyrolyzed product to a temperature usually below about 400° F in order that it can harmlessly be discharged to product storage in contact with the atmosphere. The cooling air introduced into the heat exchanger 126 and the sensible heat recovered thereby can be advantageously employed to form a combustion mixture by directly connecting the outlet of the heat exchanger to the inlet conduit 74 as schematically illustrated in FIG. 1 which in turn is introduced into the interior of the pebble lift tube in a manner to burn the carbonaceous residue from the surfaces of the pebbles as well as to effect a preheating thereof to an elevated temperature. In this regard and as schematically illustrated in FIG. 1 a portion of the combustible product gas withdrawn through the gas outlet conduit 100 can be diverted through a conduit 128 for admixture with air introduced via a conduit 130 into the inlet of the heat exchanger 126. The quantity of combustible product gas employed can be varied to effect the desired degree of reheating of the recycled pebbles in accordance with the particular type of feed material and the desired reaction to be performed.

As the pebbles are lifted through the pebble lift tube by the screw conveyor, their contact with the air or air gas mixture causes combustion to occur as a result of the presence, if any, of the combustible gas and the combustion of the carbonaceous residue or coke deposited on the surfaces of the pebbles. The combustion process is performed so as to reheat the pebbles at a temperature normally ranging from about 800° F up to about 1700° F, which will vary depending upon the specific pyrolysis or gasification process being performed in the reactor. Normally the pebbles are preheated to a temperature ranging from about 1000° F to about 1400° F in the process for producing activated char or carbon from carbonaceous vegetable matter, such as wood chips or the like. On the other hand, when the reactor is employed for the gasification of the carbonaceous feed material into a gaseous fuel of high heating value leaving only a residual ash, pebble preheat temperatures from about 1400° F to about 1700° F are preferred.

The gaseous combustion products or flue gas formed in the pebble lift tube are withdrawn through the port in the upper portion of the rotor and are discharged through the flue gas outlet conduit 78. In accordance with the preferred practice as schematically illustrated in FIG. 1, the hot flue gases are introduced through the conduit 78 into the waste heat steam generator 20 to extract a portion of the sensible heat therefrom and the cooled flue gas is subsequently employed for conveying the feed material from the hopper 10 to the upper storage hopper 14. The steam produced in the steam generator 20 can be advantageously used as all or a portion of the gas introduced into the reactor for sweeping the volatiles and other gaseous pyrolysis products from the reaction mass. In such event as shown in FIG. 1, the outlet of the steam generator 20 is connected by means of a conduit 132 for transferring the saturated or super heated steam to the gas inlet conduit 92 which in turn is disposed in communication with the gas chamber 90 (FIG. 2).

The preheated and cleansed pebbles are reintroduced into the upper portion of the reactor for admixture with fresh particulated feed material in a continuous recirculating manner. The walls of the reactor are suitably provided with removable ports or manholes (not shown) for introducing additional pebbles or for replacement with different size pebbles to provide for optimum operation consistent with the feed material being processed. Suitable temperature monitoring devices such as thermocouples (not shown) are also provided at selected locations in the reaction mass and pebble lift tube to enable proper control of the reaction temperature and pebble preheat temperature.

The reaction zone of the reactor is isolated from the oxidizing gas within the interior of the pebble lift tube at both the upper and lower portions of the lift tube. The seal at the lower end is provided by a sufficient depth of pebbles in the lower portion of the lift tube extending to a depth along the imperforate portion of the tubular shaft 70. The seal at the upper end of the lift tube is achieved by maintaining a depth of preheated pebbles in the inner and outer pebble distributor nozzles. The pressure in the reaction zone and in the pebble lift tube is kept substantially the same to prevent mixing of the product gas generated in the reaction zone with the flue gas generated in the pebble lift tube. The pressure in the pebble lift tube preferably is kept slightly below that within the reaction zone to assure that no leakage of oxidizing gas into the reaction zone occurs.

While it will be apparent that the invention herein described is well calculated to achieve the benefits and advantages hereinabove set forth, it will be appreciated that the invention is susceptible to modification, variation and change without departing from the spirit thereof.

What is claimed is:

1. A thermal reactor comprising a reactor vessel defining an elongated upright reaction chamber including upper and lower end portions, a rotary distributor in the upper portion of said chamber for introducing a particulated carbonaceous feed material and preheated pebbles into said chamber and a residue outlet in the lower portion of said chamber for withdrawing the pyrolyzed residue therefrom, a separator in the lower portion of said chamber for separating the pyrolyzed residue from the pebbles, a pebble lift conduit having upper and lower end portions and extending longitudinally of said chamber having a pebble inlet in the lower end thereof and a pebble outlet in the upper end portion thereof, conveying means in said lift conduit for conveying separated pebbles from said pebble inlet upwardly for discharge from said pebble outlet into said rotary distributor, gas supply means disposed in communication with said lift conduit for introducing an oxidizing gas for combustion of the carbonaceous residue on the pebbles and to provide a preheating of said pebbles during their ascending movement, vent means disposed in communication with the upper portion of said lift conduit for withdrawing said oxidizing gas and combustion products exteriorly of said chamber, supply means for supplying feed material to said rotary distributor, drive means for rotating said rotary distributor for mixing a portion of the preheated pebbles with the feed material in the form of a downwardly moving columnar reaction mass and for distributing the remaining portion of the pebbles substantially devoid of any feed material in the form of a downwardly moving upstream layer and a downwardly moving downstream layer overlying and surrounding said reaction mass, a gas inlet for introducing a gas into said reaction chamber along a region intermediate of said rotary distributor and said separator for passage substantially transversely through said upstream layer, said reaction mass and said downstream layer; and a gas outlet for withdrawing the gas and gaseous pyrolysis products from said reaction chamber along a region disposed adjacent the said downstream layer and transversely spaced from said gas inlet.

2. The reactor as defined in claim 1 in which said gas outlet comprises a porous conduit extending downwardly and in encircling relationship around said lift conduit, said porous conduit including an imperforate section along its upper end portion defining a collection chamber and conduit means connected to said collection chamber for withdrawing the gas and gaseous pyrolysis products exteriorly of said reaction chamber.

3. The reactor as defined in claim 1 further including a cooling device connected to said residue outlet for cooling the pyrolyzed residue discharged from said reactor.

4. The reactor as defined in claim 1 in which said pebble lift conduit extends substantially centrally of said reaction chamber.

5. The reactor as defined in claim 1 wherein said reaction chamber and said pebble lift conduit are of a generally circular transverse cross section and are disposed with the walls thereof in substantial concentric relationship.

6. The reactor as defined in claim 1 in which said conveying means comprises a screw conveyor.

7. The reactor as defined in claim 1 in which said conveying means are drivingly connected to said rotary distributor.

8. The reactor as defined in claim 1 in which said rotary distributor includes a first discharge nozzle for discharging preheated pebbles in the form of said downwardly moving upstream layer, a second nozzle for discharging the preheated pebbles in the form of said downwardly moving downstream layer and a third nozzle for discharging said feed material at a position intermediate of said upstream and said downstream layer.

9. The reactor as defined in claim 1 further including a first circular baffle and a second circular baffle mounted in substantially concentric relationship at a position adjacent to and below said rotary distributor, said first and second circular baffles defining an annular region therebetween comprising said downwardly moving columnar reaction mass, and said baffles terminating at a position above said gas inlet and outlet.

10. The reactor as defined in claim 1 in which said vent means further includes a vent chamber disposed in the upper portion of said reactor vessel in substantially gas sealed relationship with respect to said reaction chamber, a vent conduit for transferring said oxidizing gas and combustion products from said lift conduit to said vent chamber, and a vent outlet for withdrawing the gases from said vent chamber.

11. The reactor as defined in claim 1 further including heat exchange means disposed in heat exchange relationship with said vent means for recovering a portion of the sensible heat of said oxidizing gas and combustion products withdrawn from said lift conduit.

12. The reactor as defined in claim 1 in which said separator comprises a foraminous plate formed with apertures of a size smaller than that of the pebbles to permit the carbonaceous residue to pass therethrough while retaining the pebbles within said chamber.

13. The reactor as defined in claim 1 further including heat exchange means in said residue outlet for cooling the pyrolyzed residue discharged from said reactor, said gas supply means disposed in heat exchange relationship with said heat exchanger means for effecting a preheating of said oxidizing gas before introduction into said lift conduit.

14. The reactor as defined in claim 1 in which said conveying means comprises a screw conveyor rotatably mounted within said lift conduit, said screw conveyor including a tubular shaft having a lower end portion thereof disposed in sealed communication with said gas supply means for introducing the oxidizing gas into said lift conduit, and outlet ports in said tubular shaft for discharging the oxidizing gas from the interior of said shaft into said lift conduit at a position spaced upwardly from said pebble inlet.

15. The reactor as defined in claim 1 in which said rotary distributor includes a tubular shaft rotatably supported in the upper end portion of said reactor and extending outwardly of said reactor vessel, a feed discharge nozzle connected to said tubular shaft within said reaction chamber and projecting radially therefrom, and said supply means for supplying feed material is disposed in communication with the upper end of said tubular shaft.

16. The reactor as defined in claim 1 wherein said downstream layer of pebbles is adjacent said lift conduit and further including a member affixed to the lower portion of said lift conduit for retarding downward movement of the downstream layer of pebbles disposed adjacent thereto.

17. The reactor as defined in claim 1 in which said gas inlet for introducing a gas into said reaction chamber comprises a perforate wall disposed in spaced relationship inwardly of the inner surface of said vessel forming an annular gas distributing chamber.

* * * * *